United States Patent
Roffelsen

(10) Patent No.: US 6,926,069 B1
(45) Date of Patent: Aug. 9, 2005

(54) METHOD FOR MANUFACTURING A DOUBLE-WALLED HEAT EXCHANGING TUBE WITH LEAK DETECTION

(75) Inventor: Franciscus Roffelsen, Helmond (NL)

(73) Assignee: Spiro Research B.V., Helmond (NL)

( * ) Notice: Subject to any disclaimer, the term of this patent is extended or adjusted under 35 U.S.C. 154(b) by 0 days.

(21) Appl. No.: 10/031,735

(22) PCT Filed: Jul. 21, 2000

(86) PCT No.: PCT/NL00/00520

§ 371 (c)(1),
(2), (4) Date: May 10, 2002

(87) PCT Pub. No.: WO01/07856

PCT Pub. Date: Feb. 1, 2001

(30) Foreign Application Priority Data

Jul. 22, 1999 (NL) .................................. 1012676

(51) Int. Cl.$^7$ .............................. F28D 7/10; F28F 1/30
(52) U.S. Cl. ...................... 165/70; 165/154; 165/181; 29/890.036
(58) Field of Search ........................ 165/11, 2, 70, 184, 165/180; 29/890.036, 890.048

(56) References Cited

U.S. PATENT DOCUMENTS

| 3,100,930 | A | * | 8/1963 | Nihlen et al. .......... 29/890.046 |
| 3,156,042 | A | * | 11/1964 | Reed ........................... 228/126 |
| 4,259,771 | A | * | 4/1981 | Ogata et al. ................. 29/33 F |
| 4,337,824 | A | * | 7/1982 | Kirk ............................. 165/70 |
| 4,694,864 | A | * | 9/1987 | Libin .......................... 138/113 |
| 6,192,583 | B1 | * | 2/2001 | Roffelsen ............... 29/890.036 |

FOREIGN PATENT DOCUMENTS

| GB | 804592 | A | * | 11/1958 | |
| GB | 960628 | A | * | 6/1964 | |
| JP | 61-197995 | A | * | 9/1986 | .................. 165/162 |
| JP | 63-311091 | A | * | 12/1988 | .................. 165/162 |

* cited by examiner

Primary Examiner—Allen J. Flanigan
(74) Attorney, Agent, or Firm—Varnum Riddering; Schmidt & Howlett

(57) ABSTRACT

Method for manufacturing a double-walled heat exchange tube with leak detection, wherein inner tube is slipped into an outer tube, after a surface profiling has been provided on at least the outer surface of the inner tube or the inner surface of the outer tube, and at least the outer surface of the inner tube or the inner surface of the outer tube has been provided with a layer of soldering material. After the tubes have been slipped into one another, the inner tube is expanded such that the outer tube is expanded as well and the surface profiling forms a leak detection channel between the two tubes, and the soldering material between inner and outer tube is caused to melt. In a heat exchange tube thus obtained at the location of the contact between the inner and outer tube, a film-thin, optionally porous layer from soldering material is present, which layer is bonded, through melting, to both the inner tube and the outer tube.

14 Claims, 1 Drawing Sheet

METHOD FOR MANUFACTURING A DOUBLE-WALLED HEAT EXCHANGING TUBE WITH LEAK DETECTION

This invention relates to a method for manufacturing a double-walled heat exchange tube with leak detection, wherein an inner tube is slipped into an outer tube, after a surface profiling has been provided on at least the outer surface of the inner tube or the inner surface of the outer tube, and after the inner and outer tubes have been slipped one into the other, the inner tube is expanded such that the outer surface of the inner tube is in intimate contact with the inner surface of the outer tube and the surface profiling forms at least one leak detection channel between the two tubes.

Such a method is known from DE-A-30 00 665. In that method, a surface profiling is provided on the outer surface of the inner tube in the form of a serration with a great multiplicity of pointed, pyramid-shaped or cone-shaped projections. To obtain a proper heat transfer, upon expansion of the inner tube slipped into the outer tube, the tips of the various projections are pressed into the inner wall of the outer tube. Although as a result of such impression the magnitude of the contact surface between inner and outer tube is in the order of an unworked contact surface, the resulting heat transfer, in comparison with a one-piece heat exchange tube without leak detection, can be qualified as disappointing, while that heat transfer moreover deteriorates according as the heat exchange tube is longer in use.

To obtain an improved heat transfer, it is therefore proposed in DE-C-3706408 to fill up the leak detection channel with a heat-transferring fluid. As appears from the test diagram, although the heat transfer is thereby improved, it still remains considerably below that of a one-piece heat exchange tube without leak detection. In addition, this known composite heat exchange tube must meet particular conditions to maintain the leak detection function. The leak detection channel should be designed as a capillary gap and the heat-transferring fluid should have a boiling point above the maximum operating temperature of the heat exchange tube. Only then, due to the capillary action, will the fluid normally not run from the leak detection channel, but be forced therefrom in the event of leakage and thus indicate the presence of a leak. Not only is this a complicated system imposing specific requirements, but, moreover, it remains to be seen whether expansion of the heat-transferring fluid, as it heats up during use of the heat exchange tube, is not confusing, i.e. readily leads to the incorrect assumption that leakage is involved because fluid (due to expansion) is forced from the capillary leak detection channel.

Further, GB-A-822.705 discloses a heat exchange tube composed of three parts, such as an outer tube, an inner tube and a helical strip provided between those tubes and soldered both to the inner tube and to the outer tube. This construction is formed by first slipping the three parts into one another, with a layer of solder provided between each two parts. Next, the inner tube is expanded, or the outer tube is compressed, to form a mechanical connection between the assembly of outer tube, helical strip and inner tube, which mechanical connection is supplemented with a soldered joint by subjecting the assembly, during or after the deforming operation, to a heat treatment. Over a non-soldered joint, this soldered joint has the advantage that at the transition between a tube and the strip, a better, i.e. more complete, joint can be realized. On the other hand, however, through the use of three parts, the construction is more complicated; the parts, when being slipped into each other, can be positioned relative to each other less accurately due to the presence of a helical and hence flexible strip, resulting in a leak detection channel having an irregular cross section along the length thereof; the deformation of one of the tubes is to be effected through the interposition of the helical, flexible, separate strip, resulting in a mechanical connection that can be less controlled and defined; and, last but not least, there are two transitional areas formed by solder, which adversely affects the heat transfer because solder, for instance tin, always has a lower coefficient of heat transfer than the materials, for instance copper, of the parts to be connected.

The object of the invention is to increase the heat transfer to a value equal or substantially equal to that of a one-piece heat exchange tube, while, moreover, the leak detection channel remains free of filling media and thus fulfills its function directly, accurately and reliably.

In accordance with the invention, this is achieved in a method described in the preamble, if prior to slipping the inner and outer tubes one into the other, at least the outer surface of the inner tube or the inner surface of the outer tube is provided with a layer of soldering material, such as tin;

the expansion of the inner tube is effected such that the outer tube is expanded as well; and the layer of soldering material between inner and outer tube is caused to melt;

wherein the expansion of the outer tube is effected such that the molten solder layer is largely forced out between the inner tube and the outer tube into the at least one leak detection channel.

Through these features, an optimum contact between inner and outer tube is created and maintained during use of the heat exchange tube.

By expanding the outer tube by way of the inner tube, the effect achieved is that upon shrinkage of the inner tube due to a decrease in temperature of the heat exchange medium passed therethrough, the outer tube, by elastic rebound, always continues to follow the inner tube, so that the close contact between inner and outer tube is always maintained.

Accomplishing and maintaining that intimate contact is also effected and supported by soldering the inner tube and the outer tube together. Protracted tests have shown that, for instance in the case of copper/copper contact without a connecting layer, the heat transfer is highly dependent on the nature of the adjoining copper surfaces, the degree of contact (air inclusion) and the pressure at the location of the abutment. The heat transfer may decrease considerably in the course of time. It is assumed that the reason for this is the oxidation of the adjoining surface layers, partly as a result of relative movements of the surfaces through temperature change during use of the heat exchange tube. By connecting the contacting surfaces with a layer of solder from, for instance, tin, the above effect reducing the heat transfer in the course of time has been found not to occur anymore.

Tin has a lower coefficient of heat transfer than copper. It would seem, therefore, that the provision of a layer of tin between two adjoining copper surfaces has an adverse effect on the heat transfer. When the method of the invention is used, however, a heat exchange tube is obtained having a heat transfer which hardly, if at all, differs measurably from that of a one-piece copper tube. This surprising effect seems to be the result of the pressure generated between the inner and outer tube by expanding the assembly of those tubes. This pressure is such that upon melting of the layer of tin, all excess tin is forced out into the leak detection channel, leaving only a very thin film of tin, which moreover is fused with the adjoining copper surfaces. In this manner, the copper/copper contact is optimally maintained, with the (connective and filling) tin providing that no mutual detachment through relative displacement and hence no oxidation can take place, with the result that the optimum heat transfer is maintained undiminished, also in the course of time during the use of the heat exchange tube.

This effect is partly the result of the use of only two tubes which are slipped one into the other and which are each alone relatively rigid. When, through expansion of the inner tube, the outer tube is expanded, so high a surface pressure is generated on the contact area between those tubes, that during heating of the assembly, the layer of solder present between the outer tube and the inner tube is forced out practically completely, thereby yielding the copper-copper contact already mentioned. When the assembly consists of three or more parts, during the expansion of the first part, the surface pressure between the second and the third part will be less, due to the "loose" second part, because this part, certainly if in addition it is of helical design, can also deform in axial direction. Partly because the transition can be determined less accurately, as observed hereinabove, this may lead to the layer of solder being insufficiently forced out, if at all, and hence to a reduced heat transfer. Because the heat transfer depends on the weakest link in the chain, if the heat transfer between the second and the third part is less, the heat transfer of the entire construction is lower than the possible heat transfer between the first and the second part. Thus, for the present object, a two-piece construction has the critical advantages of an accurate reproducibility, an always optimal heat transfer, which, as stated above, does not measurably differ from that of a one-piece heat exchange tube, and a simple manufacture.

To enable the outer tube to optimally follow the inner tube as the latter becomes colder, it is preferred, according to a further embodiment of the invention, to manufacture the inner tube from a softer material than the outer tube. Through this feature, the elastic rebound force in the harder outer tube will be greater than in the softer inner tube, so that the outer tube will in each case be more inclined to rebound than the inner tube and the closely abutting contact between inner and outer tube is in each case optimally established and maintained and also the forcing out of the molten solder layer to the desired degree is always guaranteed still better.

The surface profiling for forming the leak detection channel can be performed in many ways. In accordance with a further embodiment of the invention, however, it is preferred that the surface profiling is performed such that, measured on the respective surface of the respective tube, it occupies at most about 50% of that surface. Extensive test measurements have shown that a double-walled heat exchange tube can then be realized which has optimum leak detection properties and a heat transfer which hardly, if at all, differs measurably from that of a one-piece tube.

In accordance with the extremely stringent government requirements applying in the Netherlands, the leak detection channel must be so arranged that when a through hole of a diameter of 2 mm is drilled in the heat exchange tube in a critical part thereof, and a water pressure of 50 kPa is applied on both sides of the tube, leakage fluid flowing from the leak detection channel must be detected within 300 s. This requirement can be met with a heat exchange tube according to the invention, and this without loss of heat transfer compared with a one-piece heat exchange tube if, according to a further embodiment, the surface profiling is provided in the form of a helical groove of a width of about 2 mm and a pitch of about 4 mm.

Heating the assembly of outer tube and inner tube for melting the layer of solder can be advantageously effected by further heat treatments to be performed on the heat exchange tube, for instance during heating for soldering fin-shaped members to at least the outer surface of the outer tube or the inner surface of the inner tube, such as a wire spiral helically wound around the tube.

A layer of solder can be provided on the inner or the outer tube or on both, independently of the presence and the time of provision of a surface profiling for forming the leak detection channel. In accordance with the invention, however, it is preferred that when the outer surface of the inner tube is coated with a layer of soldering material, a surface profiling in the form of at least one helically extending groove is subsequently provided therein. If it is preferred to provide a surface profiling in the inner surface of the outer tube, for instance through extrusion, then preferably the outer surface of the inner tube is provided with a layer of soldering material and the inner surface of the outer tube is provided with a surface profiling in the form of longitudinally extending grooves.

Depending on the application involved, it may be advantageous to pay particular attention to the ends of the heat exchange tube to prevent splitting of the two tubes, starting from an end. In that case, it is proposed that a silver weld be provided at each end of the assembly of inner and outer tube, at the seam between inner and outer tube.

Alternatively or supplemental thereto, it is further possible that at at least one of the ends of the assembly of inner and outer tube, at least the inner surface of the inner tube or the outer surface of the outer tube is provided with an insulating coating of lacquer. In this manner, the end in question is shielded from unduly great heat shocks upon a sudden change in the temperature of the heat exchange medium being passed through, for instance as may occur in central heating installations.

The invention also relates to a heat exchange tube with leak detection comprising an assembly consisting of an outer tube and an inner tube in intimately abutting contact therewith, and at least one leak detection channel extending in and adjacent to the interface between inner and outer tube, as known, for instance, from DE-A-30 006 65. To realize an optimum heat transfer in such a heat exchange tube, and also to maintain this optimum heat transfer in the course of time during use, it is proposed, according to the invention, that at the location of the contact between inner and outer tube, a film-thin layer from soldering material, such as tin, is present, which is connected to both the inner tube and the outer tube by fusion, the inner tube and the outer tube abutting against each other under a bias, so that the film-thin layer can, as it were, be porous, i.e. locally interrupted.

To render the leak detection channel optimally accessible and operational without essentially influencing the ends of the heat exchange tube, it is proposed, according to a further embodiment of the invention, that adjacent an end of the assembly of inner and outer tube, a through opening is provided in the outer tube, which through opening is in communication with the or each leak detection channel provided in the assembly.

Further protection of the ends against heat shocks is possible if at at least one of the ends of the assembly of inner and outer tube, at least the inner surface of the inner tube or the outer surface of the outer tube is provided with an insulating coating of lacquer. If, for increasing the heat-transferring capacity, fin-shaped members, such as a wire spiral helically wound around the tube, are soldered to at least the outer surface of the outer tube or the inner surface of the inner tube, it may be preferred to omit those fin-shaped members along the length of the coating of lacquer.

With reference to exemplary embodiments represented in the drawing, the method, and heat exchange tube to be obtained thereby, according to the invention, will presently be further discussed, though by way of example only. In the drawing.

Figure 1:
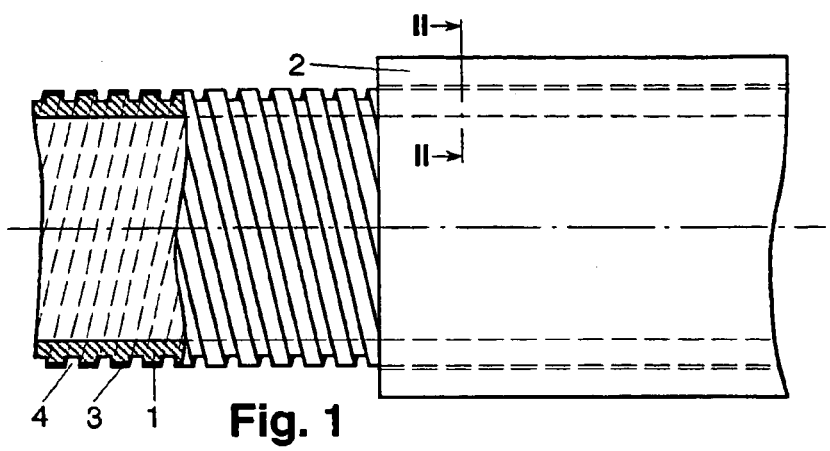
FIG. 1 shows in elevation a first assembly of an inner tube and an outer tube partly slipped into each other, with a part of the inner tube cut away.

FIG. 1 shows an inner tube 1 partly slipped into an outer tube 2. The inner tube 1 is manufactured from a smooth copper tube whose outer surface has first been provided with a thin layer of tin 3, whereafter four regularly spaced apart helically extending grooves 4 have been provided in the tin-plated surface. The outer tube 2 consists of a smooth copper tube having an inside diameter slightly greater than the outside diameter of the layer of tin on the inner tube 1.

After the inner tube 1 has been slid completely into the outer tube 2, the assembly thus obtained is subjected to a deforming operation, whereby the inner tube 1, if so desired in more than one step, using a drawing mandril, is expanded and plastically deformed such that the layer of tin proceeds to abut tightly against the inner surface of the outer tube. To maintain this abutment also upon shrinkage of the inner tube 1 due to a decrease in temperature, the expansion of the inner tube 1 is continued until the outer tube 2 is expanded as well, in such a manner that an elastic bias is generated in the outer tube 2, which provides that the outer tube 2 continues to follow the inner tube 1 upon shrinkage.

After this expanding operation, the assembly is heated to a temperature such that the layer of tin 3 starts to melt. Partly due to the elastic bias in the outer tube 2, the molten tin will start to flow and thereby, on the one hand, fuse with the copper of the two adjoining tube surfaces and, on the other, be pressed from between those two copper surfaces into the grooves 4. Thus, after the heat treatment, the two copper surfaces are soldered together in that the tin has filled and supplemented the two copper surfaces in such a manner that they actually merge without interruption. As a result, although the two copper surfaces are bonded together by the layer of tin, that layer of tin has at the same time been reduced, through the bias in the outer tube, to an extremely thin, as it were porous, film. This, in turn, has as a result that, despite the fact that tin has a lower coefficient of heat transfer than copper, the heat transfer by the assembly of tubes is hardly, if at all, measurably less than that of a comparable solid copper tube, even if the surface of the groove is as large as that of the residual rib.

Bonding the two surfaces together by means of the tin has as a consequence, inter alia, that during heat movements, shrinkage or expansion, no displacements between the two surfaces occur. This, and the fact that by filling up with tin any small irregularities between the two surfaces and forcing the excess tin into the grooves, any inclusions of air are removed, prevent oxide formation on the copper contact surfaces, and in particular slowly inwardly progressing oxidation of the copper surfaces at either of the ends (splitting through notch effect). Since oxide formation has a highly adverse effect on the heat transfer, what is thus accomplished as well is that the proper heat transfer of the composite heat exchange tube according to the invention, which, as stated, is comparable to that of a solid copper tube, is maintained also in the course of time during use.

Figure 2:
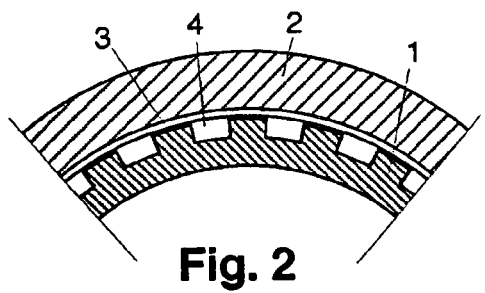
FIG. 2 shows a cross section taken on the line II—II in FIG. 1.
Figure 3:
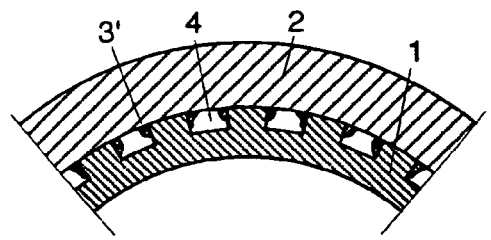
FIG. 3 shows a cross section corresponding to FIG. 2 of a completed heat exchange tube.

FIG. 2 shows the assembly of inner tube 1 and outer tube 2 before the expanding operation; FIG. 3 shows this assembly after termination of the heat treatment, i.e. in the completed condition. This is expressed in FIG. 3 in that it no longer shows the layer of tin, reduced to an extremely thin, if not porous, film, but indicates the excess tin, forced into the grooves 4, as solidified drops 3'. In FIG. 3 it is further indicated that the tubes have been expanded with respect to the situation in FIG. 2, i.e., all diameters of the tubes have increased, while further the outside diameter of the inner tube 1 has become equal to the inside diameter of the outer tube 2.

It is noted that the various dimensions are not shown to scale, which is true in particular of the layer of tin 3. Hereinbelow, it is indicated, exclusively by way of example, how a composite heat exchange tube having an outside diameter of 28.3 mm and an inside diameter of 23 mm can be obtained.

The starting point is an inner tube of half-hard copper having an outside diameter of 25 mm and an inside diameter of 22 mm and an outer tube of hard copper having an outside diameter of 28 mm and an inside diameter of 25.6 mm. After the tubes have been inserted one into the other and expanded in two steps, a composite heat exchange tube functioning as a one-piece heat exchange tube is obtained, having an outside diameter of 28.3 mm and an inside diameter of 23 mm, the transition (tin film) between the inner and outer tubes being located at a diameter of 26 mm. The total wall thickness involved has decreased from 2.7 mm to 2.65 mm. This is a result of the cold deformation (expansion) whereby the composite tube becomes slightly longer. The measurements mentioned have been selected after it had been established, through tests, that at such a degree of expansion, the elastic rebound of the outer tube is sufficient for the outer tube to follow a sudden shrinkage of the inner tube due to a temperature shock of 100° C. to 10° C. without itself needing to decrease in temperature.

Figures 4, 5:
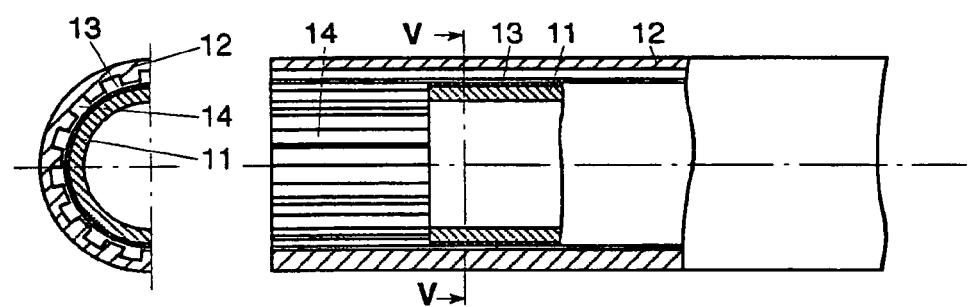
FIG. 4 shows in elevation a second assembly of an inner tube and an outer tube, partly slipped into each other, with a part of the inner tube and of the outer tube cut away.
FIG. 5 shows half a cross section taken on the line V—V in FIG. 4.

The choice of material (half-hard copper for the inner tube and hard copper for the outer tube) promotes the desired elastic rebound effect, because softer material rebounds less than harder material. In the exemplary embodiment according to FIGS. 4 and 5, a copper inner tube 11, provided with a layer of tin 13, has been inserted into an outer tube 12 whose inner surface comprises fifteen grooves 14, for instance obtained by extrusion, extending in longitudinal direction of the tube. The situation in which the two tubes are shown is identical to that of FIG. 1, i.e., after the tubes have been completely slipped one into the other, expansion will take place to the degree described in the foregoing, after which, through a heat treatment, the layer of tin 13 is caused to melt, whereby the excess tin at the location of the longitudinal ridges on the outer surface of the inner tube 11, as described hereinabove, is forced out, to form a residual, filling and connective film of tin, into the longitudinal grooves 14 forming a leak detection channel, thus yielding a composite heat exchange tube with heat detection functioning as a one-piece heat exchange tube and having a configuration comparable to that according to FIG. 3.

Figure 6:
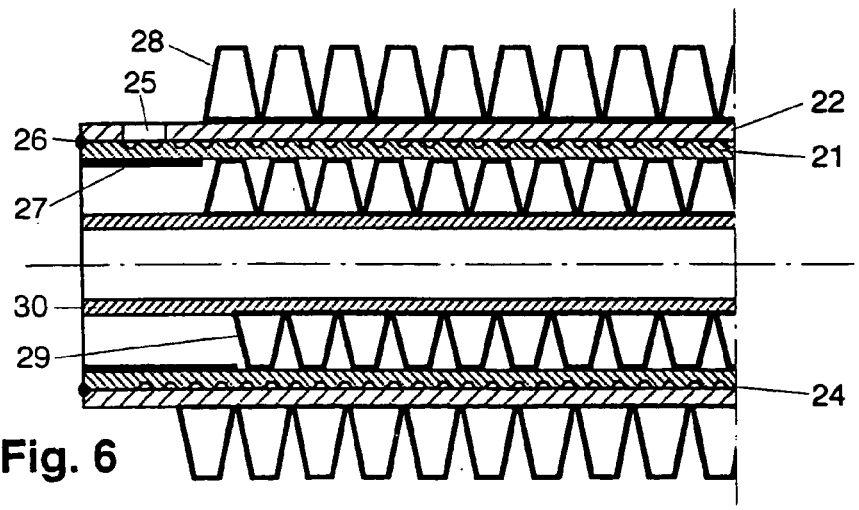
FIG. 6 shows a third variant of a heat exchange tube.

FIG. 6 shows a heat exchange tube comprising an inner tube 21 and an outer tube 22, tightly abutting against each other and connected through a film of tin, all in a manner as discussed hereinabove. At the transition between the two tubes 21, 22, a single helical groove 24 has been provided in the outer surface of the inner tube 21, which groove forms a leak detection channel. Such a leak detection channel is prescribed in situations where the heat-releasing medium must never come into contact with the heat-absorbing medium. If a crack is formed in the inner or the outer tube, medium leaking therethrough will end up in the leak detection channel. To be able to establish the presence of fluid in the leak detection channel, this should be perceptible. For this reason, an opening 25 has been provided in the outer tube 22, which opening is in open contact with the leak detection channel. The opening 25 may be in communication with a leak detection means detecting the medium which has leaked or a change in pressure.

It has already been mentioned that the splitting of the composite heat exchange tube is extremely disadvantageous to the heat transfer, and how such splitting is prevented in the present heat exchange tubes. A further safeguard in this regard can be provided through the provision of a silver weld 26 (see FIG. 6) at the transition between the inner tube 21 and the outer tube 22, at at least one of the ends of the composite heat exchange tube. In addition to or instead of this reinforcement, it may also be provided that the end in question is less exposed to heat shocks through the provision of an insulating coating of lacquer 27 (see FIG. 6).

To increase the heat transfer, fins or ribs may be provided on the outer surface of the outer tube 22 or the inner surface of the inner tube 21. Such fins or ribs can be formed through extrusion. Another possibility is the provision of a helically wound wire 28 (for instance having a trapezoidal winding profile; see FIG. 6) which is subsequently wound helically around the outer tube 22. Connecting such wire to a tube is effected by soldering. This heat treatment may simultaneously serve to melt the layer of tin between the inner tube and outer tube to obtain a composite heat exchange tube functioning as in one piece, as described in the foregoing.

In the embodiment according to FIG. 6, the inner tube is likewise provided with fin-shaped members, again in the form of a helically wound wire 29 helically wound around and fixed on a support tube 30 concentrically inserted into the inner tube 21. If desired, the inner surface of the inner tube 21 may be tin-plated, so that during the heat treatment referred to above, the ends of the wound wire 29 remote from the support tube 30 are secured to the inner surface of the inner tube 21.

It is readily understood that within the framework of the invention as laid down in the appended claims, many more modifications and variants are possible. Thus, for forming a leak detection channel in the above-discussed exemplary embodiments, grooves are provided in the inner surface of the outer tube or the outer surface of the inner tube. Of course, grooves may also be provided in both surfaces, or the various grooves may be interconnected by further grooves, yielding a more or less knurled surface. Further, copper and tin are mentioned as applicable materials; however, this does not exclude the use of other materials. Further, under certain circumstances, it is possible to omit the heat treatment for melting and partly forcing out the layer of tin, for instance when the expansion is accompanied by a heat development such that the soldering material already melts during expansion.

What is claimed is:

1. A method for manufacturing a double-walled heat exchange tube with a leak detection channel; the method comprising the steps of:
   providing inner and outer tubes, with the outer tube having an inner surface and the inner tube having an outer surface, the inner tube being manufactured of a softer material than the material of the outer tube;
   providing a surface profiling on at least one of the inner surface of the outer tube and the outer surface of the inner tube;
   selectively providing at least one of the inner surface and said outer surface with a layer of soldering material;
   expanding said inner tube such that the outer surface of the inner tube is in intimate contact with the inner surface of the outer tube and the surface profiling forms at least one leak detection channel between the two tubes;
   expanding the inner tube such that the outer tube is expanded as well;
   causing the layer of soldering material between the inner tube and the outer tube to be melted;
   wherein the expansion of the outer tube is effected such that the molten solder is forced out between the inner tube and the outer tube into the leak detection channel.

2. The method in accordance with claim 1 wherein the surface profiling is carried out of such that it occupies at most 50% of a surface.

3. The method in accordance with claim 2 wherein the surface profiling in the form of a helical groove having a width of about 2 mm and a pitch of about 4 mm.

4. The method in accordance with claim 1 wherein the heating takes place by soldering a wire spiral would helically on a surface of at least one of inner tube and outer tube.

5. The method in accordance with claim 1, wherein the outer surface of the inner tube is coated with a layer of soldering material and a surface profiling comprising at least on helically extending groove is provided.

6. The method in accordance with claim 1, wherein the outer surface of the inner tube is provided with a layer of soldering material and the inner surface of the outer tube is provided with a surface profiling in the form of longitudinally extending grooves.

7. The method in accordance with claim 1, wherein a silver weld is provided at a seam between the inner tube and the outer tube.

8. The method in accordance with claim 1 wherein at at least one of the ends of the assembly of the inner tube and the outer tube at least one of the inner surface of the inner tube and the outer surface of the outer tube is provided with an insulating coating of lacquer.

9. A heat exchange tube for use in a heat exchanger employing a liquid and comprising:
   an assembly of an outer tube and an inner tube disposed internally to said outer tube and retained in an abutting position under a bias pressure, to form an inner face between said inner tube and said outer tube;
   a leak detection channel extending adjacent said inner face;
   a through opening extending through said outer tube at a position adjacent an end of said assembly of said inner tube and outer tube, said through opening being in communication with the leak detection channel; and
   a film-thin layer formed of a soldering material disposed in contact with both the inner tube and the outer tube and wherein the inner tube and the outer tube are retained in abutting contact under the bias pressure.

10. The heat exchange tube in accordance with claim 9 wherein at least one of the ends of said assembly is provided with an insulating coating of lacquer on at least one of the inner surface of the inner tube and the outer surface of the outer tube.

11. The heat exchange tube in accordance with claim 9, wherein one of the outer surface of the outer tube and the inner surface of the inner tube is provided with fin-shaped members.

12. The heat exchange tube in accordance with claim 9, wherein fin-shaped member are soldered on at least an outer surface of said outer tube and wherein the fin-shaped members comprise a wire spiral helically wound around the outer tube and soldered to the outer tube.

13. The heat exchange tube in accordance with claim 9, wherein a surface profiling measured on a surface of one of said tubes occupies at most 50% of said surface.

14. The method according to claim 9 wherein said surface profiling comprises a helical groove having a width of 2 mm and a pitch of 4 mm.

* * * * *

UNITED STATES PATENT AND TRADEMARK OFFICE
CERTIFICATE OF CORRECTION

PATENT NO. : 6,926,069 B1
APPLICATION NO. : 10/031735
DATED : August 9, 2005
INVENTOR(S) : Roffelsen, Franciscus It is certified that error appears in the above-identified patent and that said Letters Patent is hereby corrected as shown below:

On The Title Page: Item (54)
In the Title

Please add --AND SUCH HEAT EXCHANGING TUBE-- at end of the title.

In the Claims

Col 8, claim 3, line 30:

The words --is provided-- should be added after the word "profiling";

Col 8, claim 4, line 33:

The word "would" should be deleted and replaced with --wound--;

Col 8, claim 5, line 38:

The word "on" should be deleted and replaced with --one--;

Col 9, claim 12, line 11:

The word "member" should be deleted and replaced with --members--.

Signed and Sealed this

First Day of August, 2006

JON W. DUDAS
*Director of the United States Patent and Trademark Office*